United States Patent
Huang et al.

(10) Patent No.: US 10,257,536 B2
(45) Date of Patent: Apr. 9, 2019

(54) METHOD OF TEMPORAL DERIVED BI-DIRECTIONAL MOTION VECTOR FOR MOTION VECTOR PREDICITON

(71) Applicant: MediaTek Singapore Pte. Ltd., Singapore (SG)

(72) Inventors: Han Huang, Beijing (CN); Jicheng An, Beijing (CN); Kai Zhang, Beijing (CN); Xianguo Zhang, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 124 days.

(21) Appl. No.: 15/323,809

(22) PCT Filed: Jul. 15, 2015

(86) PCT No.: PCT/CN2015/084043
§ 371 (c)(1),
(2) Date: Jan. 4, 2017

(87) PCT Pub. No.: WO2016/008409
PCT Pub. Date: Jan. 21, 2016

(65) Prior Publication Data
US 2017/0171558 A1 Jun. 15, 2017

Related U.S. Application Data

(63) Continuation-in-part of application No. PCT/CN2014/082538, filed on Jul. 18, 2014.

(51) Int. Cl.
*H04N 7/12* (2006.01)
*H04N 11/02* (2006.01)
(Continued)

(52) U.S. Cl.
CPC ......... *H04N 19/577* (2014.11); *H04N 19/517* (2014.11); *H04N 19/52* (2014.11); *H04N 19/70* (2014.11)

(58) Field of Classification Search
CPC .... H04N 19/577; H04N 19/517; H04N 19/52; H04N 19/70
(Continued)

(56) References Cited

U.S. PATENT DOCUMENTS 8,005,144 B2    8/2011   Ji et al.
2006/0256866 A1*  11/2006   Ziauddin ................ H04N 19/51
                                                    375/240.15
(Continued)

FOREIGN PATENT DOCUMENTS

CN       1525762     9/2004
CN       101031087   9/2007
(Continued)

OTHER PUBLICATIONS

International Search Report dated Sep. 30, 2015, issued in application No. PCT/CN2015/084043.
(Continued)

*Primary Examiner* — Jared Walker
(74) *Attorney, Agent, or Firm* — McClure, Qualey & Rodack, LLP

(57) ABSTRACT

A method and apparatus of deriving a temporal derived motion vector in a second direction based on a given motion vector in a first direction for motion vector prediction are disclosed. According to the present invention, a given motion vector for a current block is determined, where the given motion vector points from the current block in a first direction. A reference motion vector associated with a first reference block in a first reference frame is identified. Then, based on the reference motion vector and the given motion vector, a temporal derived motion vector is derived. The temporal derived motion vector points from the current block to a second reference block in a second reference frame in a second direction different from the first direction. The temporal derived motion vector is then used as one predictor for encoding or decoding of the motion vector of the current block.

19 Claims, 2 Drawing Sheets

(51) Int. Cl.
  *H04N 11/04* (2006.01)
  *H04N 19/577* (2014.01)
  *H04N 19/52* (2014.01)
  *H04N 19/517* (2014.01)
  *H04N 19/70* (2014.01)
(58) Field of Classification Search
  USPC .................................................. 375/240.15
  See application file for complete search history.

(56) References Cited

U.S. PATENT DOCUMENTS

2012/0263231 A1* 10/2012 Zhou ...................... H04N 19/52
                                                                375/240.12
2013/0243093 A1    9/2013  Chen et al.
2015/0281708 A1* 10/2015 Chuang .................. H04N 19/52
                                                                375/240.02

FOREIGN PATENT DOCUMENTS

CN        101827269         9/2010
WO      2013/057359 A1     4/2013

OTHER PUBLICATIONS

Zhang, L., et al.; "Inter-view motion prediction in 3D-HEVC;" IEEE; 2014; pp. 17-20.
Lin, J.L., et al.; "Improved Advanced Motion Vector Prediction;" Joint Collaborative Team on Video Coding (JCT-VC) of ITU-T SG16 WP3 and ISO/IEC JTC1/SC29/WG11; Jan. 2011; pp. 1-8.

* cited by examiner

METHOD OF TEMPORAL DERIVED BI-DIRECTIONAL MOTION VECTOR FOR MOTION VECTOR PREDICITON

CROSS REFERENCE TO RELATED APPLICATIONS

The present invention is a National Stage Application of PCT Patent Application, Serial No. PCT/CN2015/084043, filed on Jul. 15, 2015, which is a Continuation-In-Part of PCT Patent Application, Serial No. PCT/CN2014/082538, filed on Jul. 18, 2014. The PCT Patent Application is hereby incorporated by reference in its entirety.

TECHNICAL FIELD

The present invention relates to video coding. In particular, the present invention relates to deriving bi-direction motion vector from a uni-directional motion vector for a motion vector prediction.

BACKGROUND

Motion estimation is an effective inter-frame coding technique to exploit temporal redundancy in video sequences. Motion-compensated inter-frame coding has been widely used in various international video coding standards. The motion estimation adopted in various coding standards is often a block-based technique, where motion information such as coding mode and motion vector is determined for each macroblock or similar block configuration. For motion compensation prediction (MCP) coding, a current block is predicted by a reference block. The displacement between current block and reference block is referred to as motion vector (MV). The motion vector is signaled to the decoder. When two reference blocks are used, i.e. bi-directional prediction, two motion vectors are signaled. The inter-predicted or intra-predicted residues are usually further processed by transformation, quantization, and entropy coding to generate compressed video bitstream.

To reduce the amount of data used for coding motion vectors, motion vector predictor (MVP) has been widely used in advanced coding standard such as High Efficiency Video Coding (HEVC). The MVP is derived from spatial or temporal neighboring coded blocks. For example, multiple MVPs are used in AMVP (advanced motion vector prediction) and merge modes in HEVC. It is desirable to further improve the coding efficiency of MVP.

SUMMARY

A method and apparatus of deriving a temporal derived motion vector in a second direction based on a given motion vector in a first direction for motion vector prediction are disclosed. According to the present invention, a given motion vector for a current block is determined, where the given motion vector points from the current block in a first direction. A reference motion vector associated with a first reference block in a first reference frame is identified. Then, based on the reference motion vector and the given motion vector, a temporal derived motion vector is derived. The temporal derived motion vector points from the current block to a second reference block in a second reference frame in a second direction different from the first direction. The temporal derived motion vector is then used as one predictor for encoding or decoding of the motion vector of the current block.

The first reference block in the first reference frame can be located by shifting a corresponding center, top-left or other position of the current block by the given motion vector. The given motion vector for the current block can be determined based on the motion vector of a spatial or temporal neighboring block of the current block. The temporal derived motion vector can be determined according to the sum of the given motion vector and the reference motion vector.

If the given motion vector points to another reference frame different from the first reference frame, the given motion vector is scaled to point to the first reference frame. Similarly, if the reference motion vector points to another reference frame different from the second reference frame, the reference motion vector can be scaled to point to the second reference frame. Furthermore, if the temporal derived motion vector points to another reference frame different from the second reference frame, the temporal derived motion vector can be scaled to point to the second reference frame.

In one embodiment, one or more coding parameters are checked to determine whether the reference motion vector is valid or not. The reference motion vector is used to derive the temporal derived motion vector only if the reference motion vector is valid. For example, the reference motion vector is invalid if the second reference block is skip mode or merge mode, or coded block flag (cbf) of the second reference block is zero.

In one embodiment, the temporal derived motion vector is used in merge mode. One or more temporal derived motion vectors can be generated for adding to the merge candidate list and each temporal derived motion vector is derived using one motion vector in an original merge candidate list as one given motion vector. Redundancy checking can be applied to the temporal derived motion vectors, and any redundant temporal derived motion vector is not added to the merge candidate list. The temporal derived motion vectors can be placed at a pre-defined position of the merge candidate list. For example, the temporal derived motion vectors can be placed in the merge candidate list after all spatial and temporal merge candidates and a number of said one or more temporal derived motion vectors allowed to add to the merge candidate list depends on a maximum size of the merge candidate list.

In another embodiment, the temporal derived motion vector is used in AMVP (advanced motion vector prediction) mode. For example, one or more temporal derived motion vectors can be generated for adding to an AMVP merge candidate list and each temporal derived motion vector is derived using one motion vector in an original AMVP candidate list as one given motion vector.

The temporal derived motion vector for motion vector prediction can be applied adaptively by using one or more syntax elements to indicate whether to enable the temporal derived motion vector for motion vector prediction. The syntax elements can be explicitly signaled in a sequence level, video level, picture level or slice level. Whether to use the temporal derived motion vector for motion vector prediction can also be determined at a decoder side implicitly. For example, the decision can be made according to mode selections, motion parameters of neighboring coded blocks of the current block, or motion parameters of the first reference block, the second reference block or both.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
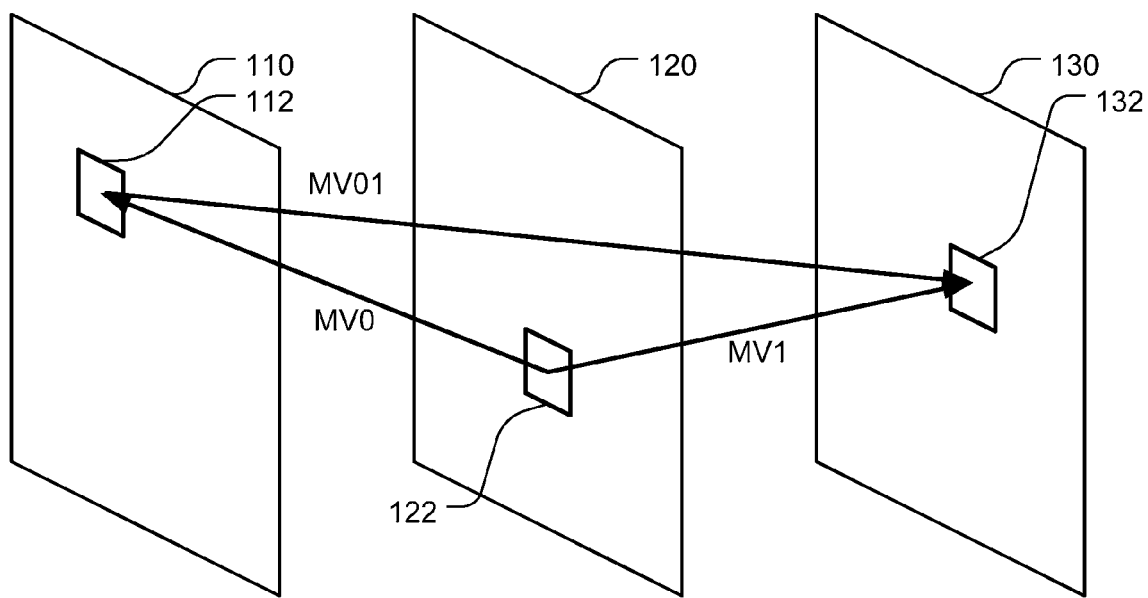
FIG. 1 illustrates an example of temporal-derived bi-direction (TDB) motion vector predictor (MVP), where MV0 represents a given motion vector of the current block in one direction, MV01 represents a reference motion vector, and MV1 represents the temporal derived motion vector.

In order to improve the coding efficiency associated with motion vector prediction (MVP), the present invention derives additional temporal motion vector (also referred to as "temporal derived motion vector (MV)") based on a given motion vector to form bi-directional motion vector predictors (MVPs) for a current block. In this disclosure, the term MVP may refer to motion vector prediction or motion vector predictor depending on related context. FIG. 1 illustrates an example of temporal-derived bi-direction (TDB) motion vector predictor (MVP). Motion vector MV0 represents the motion vector of the current block (122) of the current frame (120) in one direction. As shown in FIG. 1, motion vector MV0 points to a reference block (112) in reference frame (110). Motion vector MV0 of reference block (112) points to another reference block (132) in another reference frame (130) corresponding to another direction. Motion vector MV01 along with the motion vector MV0 is used to derive a new motion vector MV1 for current block in the other direction. The two MVs (i.e., MV0 and MV1) form a bi-directional motion vector predictor for the current block.

The location of the reference block (112) in the reference frame can be located by shifting the corresponding center, top-left or any other position of the current block (122) by the MV0.

For applications in motion vector prediction, motion vector MV0 may correspond to the MV of a previously coded block. Therefore, motion vector MV0 may be derived from a spatial or temporal neighboring block of the current block (122) according to the present invention. Furthermore, in MVP-based coding, differential coding may be used to reduce required data for coding the motion vector, where the difference between the current MV and the MVP is coded. Accordingly, motion vector MV0 may be signaled by differential coding.

In one embodiment, the derived MV1 can be obtained by adding MV0 and MV01, i.e.

MV1=MV0+MV01.

If motion vector MV0 points to a reference frame different from the first target reference frame (e.g. reference frame 110), motion vector MV0 can be scaled accordingly according to one embodiment of the present invention. Various motion vector scaling techniques are known in the art. For example, temporal motion vector scaling can be performed according to picture order count (POC). Similarly, if motion vector MV1 points to a reference frame different from the second target reference frame (e.g. reference frame 130), motion vector MV1 can be scaled accordingly according to one embodiment of the present invention. Furthermore, if motion vector MV01 points to a reference frame different from the second target reference frame (e.g. reference frame 130), motion vector MV01 can be scaled accordingly according to one embodiment of the present invention. The first and second target reference frames are, for example, the predetermined reference frames associated with the current block (122).

Some coding parameters or conditions may also be checked to determine whether the reference motion vector (i.e., MV01) is valid. If motion vector MV01 is not valid, the TDB MVP may be skipped or other alternative procedure is applied. For example, the condition corresponding to whether the reference block (132) is coded in skip mode or merge mode or whether the coded block flag (cbf) of the reference block (132) is zero can be checked to determine whether motion vector MV01 is valid. If any of the above condition is true, motion vector MV01 is invalid.

The TDB motion vector predictor can be applied in different MVP scenario. For example, the TDB MVP can be used as a candidate in the merge mode in HEVC. Furthermore, motion vector from each of the spatial candidate can be used as the given MV (i.e., MV0). The TDB MVP can be added to the merge candidate list as an additional candidate, namely TDB merge candidate. Similarly, motion vector from each of the temporal merge candidate can also be used as the given MV (i.e., MV0). The TDB MVP is added to the merge candidate list as a TDB candidate.

In another embodiment, a redundancy checking process can be used to check whether the TDB merge candidate is the same as any candidate already in the merge candidate list. If so, the TDB merge candidate is redundant and is not added.

When a merge candidate list is used, the merge candidates in the merge candidate list are placed in the list according to certain orders. Each merge candidate can be identified by an index. If the TDB merge candidate is generated for each MV in the merge candidate list (i.e., the original merge candidate list before adding any the TDB merge candidate), multiple TDB merge candidates may be generated for multiple MVs in the original merge candidate list. In one embodiment, the TDB merge candidate or candidate are placed at a predefined position in the list. In another embodiment, the TDB merge candidate or candidate can be placed after the spatial and temporal merge candidate. The number of the TDB merge candidates that can be added to the merge candidate list can be determined by the maximum size of merge candidate list and the number of existing merge candidates.

In another embodiment, the use of TDB MVP for a merge candidate is applied adaptively. For example, a syntax element may be used to indicate whether uni-directional or bi-directional merge candidate is used for deriving the corresponding merge candidate.

In yet another embodiment, whether to add the TDB merge candidate may depend on the reference lists associated with the two reference frames (i.e., reference frames 110 and 130 in FIG. 1). For example, if the two reference lists are the identical, the TDB merge candidate will not be added. Otherwise, the TDB merge candidate will be added.

In another example, the TDB MVP can be used as a candidate in the AMVP (advanced motion vector prediction) mode in HEVC. In this case, motion vector MV0 can be derived from the MV in AMVP candidate list. The TDB MVP process can be used to derive motion vector MV1 and the TDB MVP is added to the AMVP candidate list in the other direction. Alternatively, the TDB MVP can be used as the MV in the other direction without signaling MVD.

When the TDB MVP is used as a candidate in merge or AMVP mode, one or more syntax elements are used to signal whether the bi-directional motion vector predictor is used. Furthermore, the syntax elements can be explicitly transmitted in the sequence, video, picture or slice level, such as SPS (sequence parameter set), VPS (video parameter set), PPS (picture parameter set), APS (adaptation parameter set) or slice header. Alternatively, the information regarding whether the bi-directional motion vector predictor is used for merge or AMVP candidate list can be derived implicitly at the decoder side. The information can be derived implicitly at the decoder side according to mode selections or motion parameters of the neighboring coded blocks of the current block (122), or according to the motion parameters of the reference block (112) and/or the reference block (132).

Figure 2:
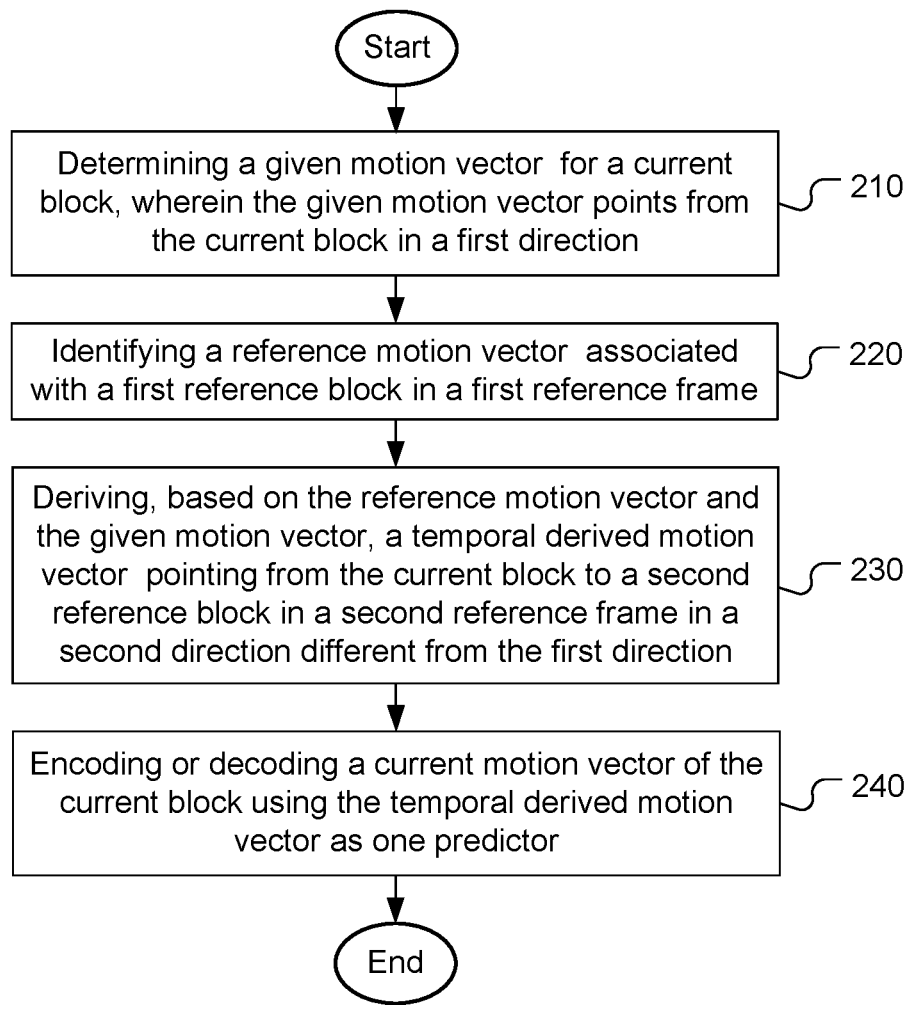
FIG. 2 illustrates an exemplary flowchart for a video coding system incorporating temporal-derived bi-direction (TDB) motion vector predictor (MVP) according to an embodiment of the present invention.

FIG. 2 illustrates an exemplary flowchart for a video coding system incorporating temporal-derived bi-direction (TDB) motion vector predictor (MVP) according to an embodiment of the present invention. A given motion vector for a current block is determined, wherein the given motion vector points from the current block in a first direction as shown in step 210. A reference motion vector associated with a first reference block in a first reference frame is identified in step 220. Based on the reference motion vector and the given motion vector, a temporal derived motion vector is determined in step 230, where the temporal derived motion vector points from the current block to a second reference block in a second reference frame in a second direction different from the first direction. The temporal derived motion vector is then used as one predictor for encoding or decoding the current motion vector of the current block in step 240.

The exemplary flowchart shown in FIG. 2 is for illustration purpose. A skilled person in the art may re-arrange, combine steps or split a step to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of motion vector prediction, the method comprising:
   determining a given motion vector for a current block, wherein the given motion vector points from the current block and corresponds to a first direction with respect to the current block;
   identifying a first reference block in a first reference frame based on the given motion vector;
   identifying a reference motion vector associated with the first reference block and corresponding to a second direction with respect to the current block, wherein the reference motion vector points to a second reference block in a second reference frame, and the first direction is different from the second direction;
   deriving, based on the reference motion vector and the given motion vector, a temporal derived motion vector pointing from the current block to the second reference block;
   forming a temporal-derived bi-direction motion vector predictor for the current block based on the given motion vector and the temporal derived motion vector; and
   encoding or decoding a current motion vector of the current block using a candidate list comprising the temporal-derived bi-direction motion vector predictor.

2. The method of claim 1, wherein the first reference block in the first reference frame is located by shifting a corresponding center, top-left or other position of the current block by the given motion vector.

3. The method of claim 1, wherein the given motion vector for the current block is determined based on a motion vector of a spatial or temporal neighboring block of the current block.

4. The method of claim 1, wherein the temporal derived motion vector corresponds to a sum of the given motion vector and the reference motion vector.

5. The method of claim 1, wherein if the given motion vector points to another reference frame different from the first reference frame, the given motion vector is scaled to point to the first reference frame.

6. The method of claim 1, wherein if the reference motion vector points to another reference frame different from the second reference frame, the reference motion vector is scaled to point to the second reference frame.

7. The method of claim 1, wherein if the temporal derived motion vector points to another reference frame different from the second reference frame, the temporal derived motion vector is scaled to point to the second reference frame.

8. The method of claim 1, wherein one or more coding parameters are checked to determine whether the reference motion vector is valid or not, and the reference motion vector is used to derive the temporal derived motion vector only if the reference motion vector is valid.

9. The method of claim 8, wherein the reference motion vector is invalid if the second reference block is skip mode or merge mode, or a coded block flag (cbf) of the second reference block is zero.

10. The method of claim 1, wherein the temporal derived motion vector is used in merge mode or the temporal derived motion vector is used in AMVP (advanced motion vector prediction) mode.

11. The method of claim 10, wherein one or more temporal derived motion vectors are generated for adding to a merge candidate list and each temporal derived motion vector is derived using one motion vector in an original merge candidate list as one given motion vector.

12. The method of claim 11, wherein redundancy checking is applied to said one or more temporal derived motion vectors, and any redundant temporal derived motion vector is not added to the merge candidate list.

13. The method of claim 11, wherein said one or more temporal derived motion vectors are placed at a pre-defined position of the merge candidate list.

14. The method of claim 13, wherein said one or more temporal derived motion vectors are placed in the merge candidate list after all spatial and temporal merge candidates and a number of said one or more temporal derived motion vectors allowed to be added to the merge candidate list depends on a maximum size of the merge candidate list.

15. The method of claim 1, wherein one or more temporal derived motion vectors are generated for adding to an AMVP merge candidate list and each of the one or more temporal derived motion vectors is derived using one motion vector in an original AMVP candidate list as one given motion vector.

16. The method of claim 1, wherein one or more syntax elements are used to indicate whether to enable the temporal derived motion vector for motion vector prediction.

17. The method of claim 1, wherein whether to use the temporal derived motion vector for motion vector prediction is determined at a decoder side implicitly.

18. The method of claim 17, wherein whether to use the temporal derived motion vector for the motion vector prediction is determined at the decoder side according to mode selections, motion parameters of neighboring coded blocks of the current block, or motion parameters of the first reference block, the second reference block or both.

19. An apparatus for motion vector prediction, the apparatus comprising one or more electronic circuits configured to:
  determine a given motion vector for a current block, wherein the given motion vector points from the current block and corresponds to a first direction with respect to the current block;
  identify a first reference block in a first reference frame based on the given motion vector;
  identify a reference motion vector associated with the first reference block and corresponding to a second direction with respect to the current block, wherein the reference motion vector points to a second reference block in a second reference frame, and the first direction is different from the second direction;
  derive, based on the reference motion vector and the given motion vector, a temporal derived motion vector pointing from the current block to the second reference block;
  form a temporal-derived bi-direction motion vector predictor for the current block based on the given motion vector and the temporal derived motion vector; and
  encode or decode a current motion vector of the current block using a candidate list comprising the temporal-derived bi-direction motion vector predictor.

* * * * *